G. REMNSNIDER.
STENCIL CUTTING MACHINE.
APPLICATION FILED FEB. 1, 1913.

1,131,956.

Patented Mar. 16, 1915.
5 SHEETS—SHEET 1.

WITNESSES:
Chas. A. Becker,
W. H. Alexander.

INVENTOR
George Remnsnider,
BY
E. E. Huffman
ATTORNEY

G. REMNSNIDER.
STENCIL CUTTING MACHINE.
APPLICATION FILED FEB. 1, 1913.

1,131,956.

Patented Mar. 16, 1915.
5 SHEETS—SHEET 2.

WITNESSES:
Chas. A. Becker.
W. A. Alexander.

INVENTOR
George Remnsnider,
BY
E. E. Huffman
ATTORNEY

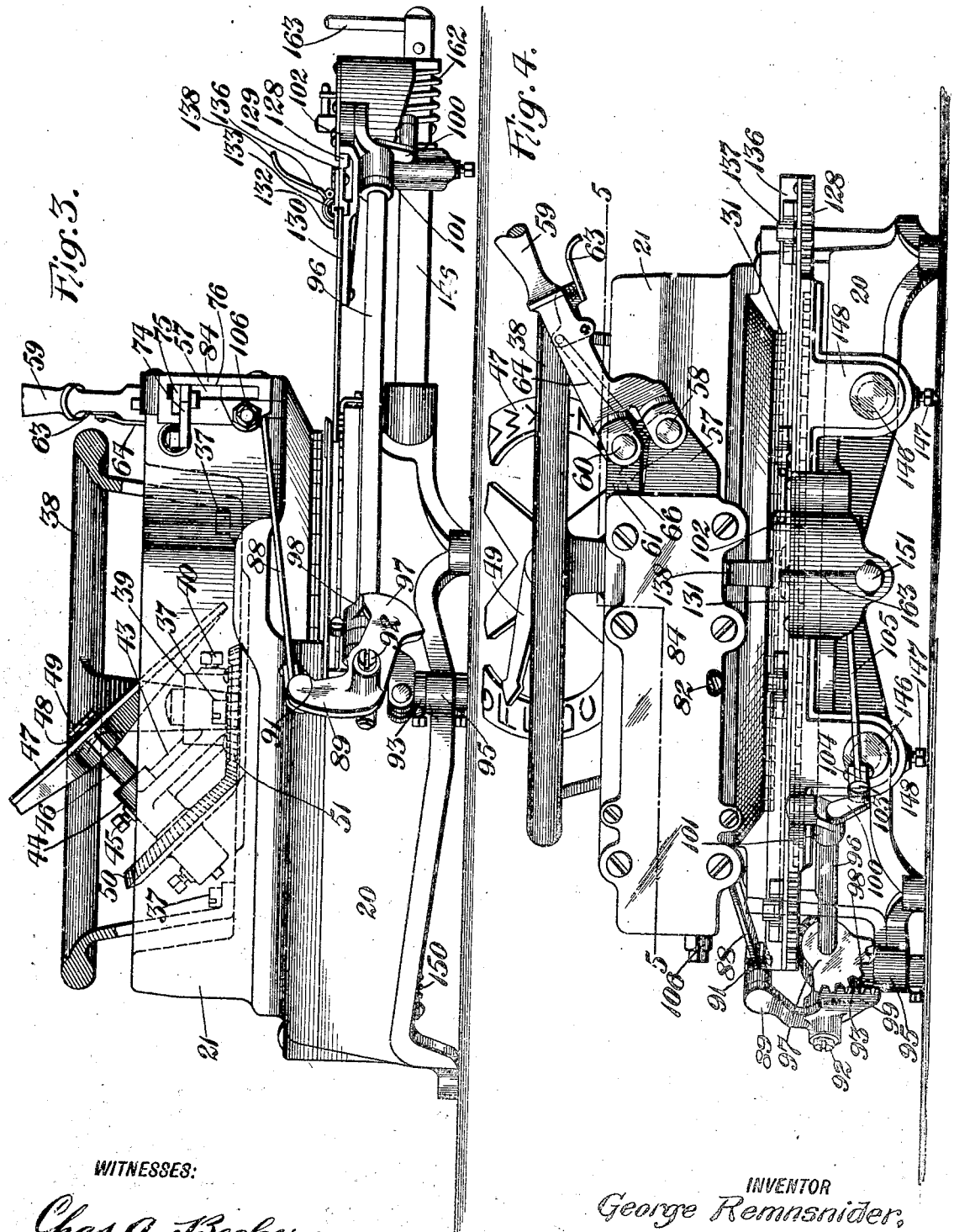

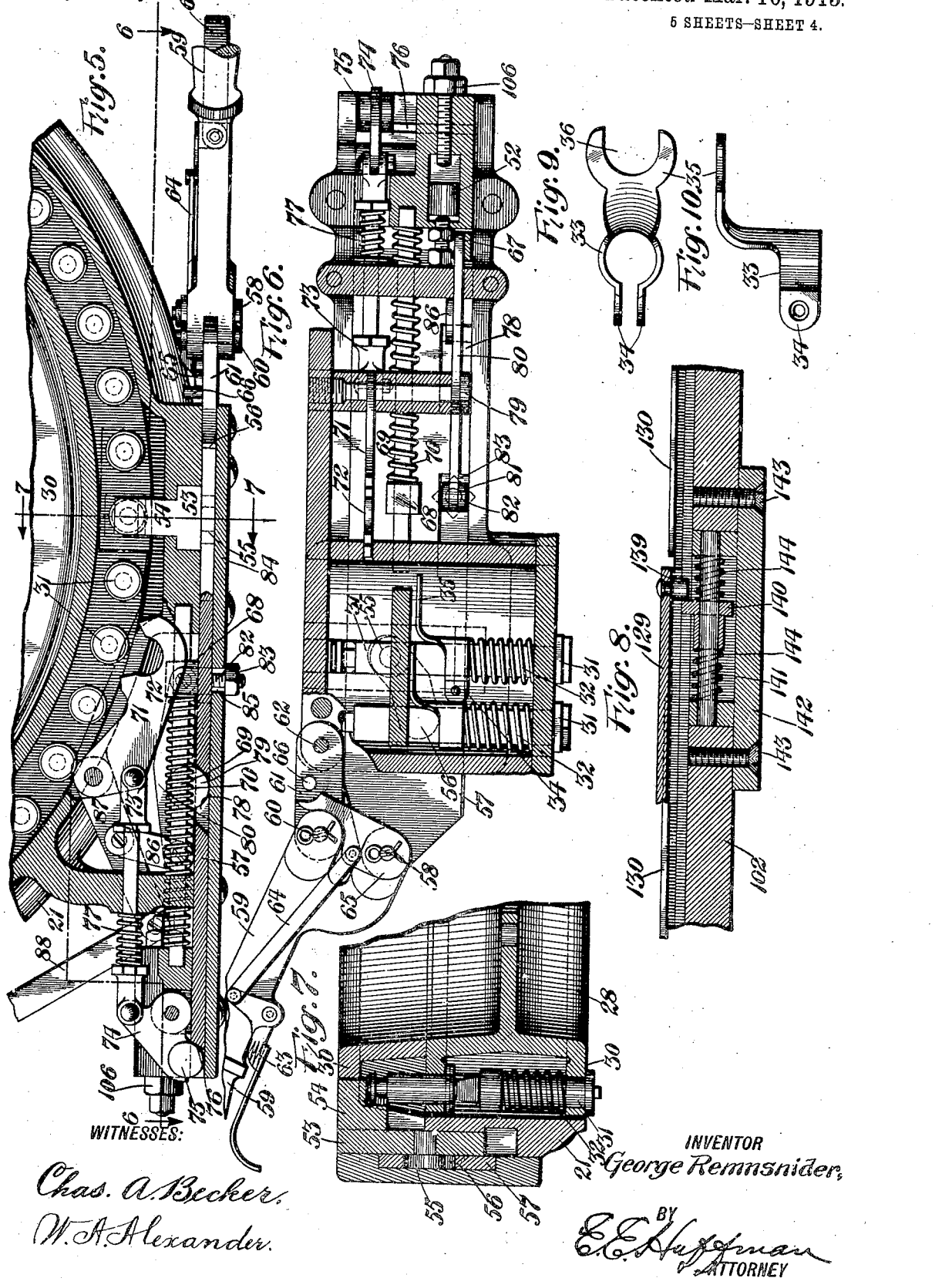

G. REMNSNIDER.
STENCIL CUTTING MACHINE.
APPLICATION FILED FEB. 1, 1913.
1,131,956.
Patented Mar. 16, 1915.
5 SHEETS—SHEET 5.
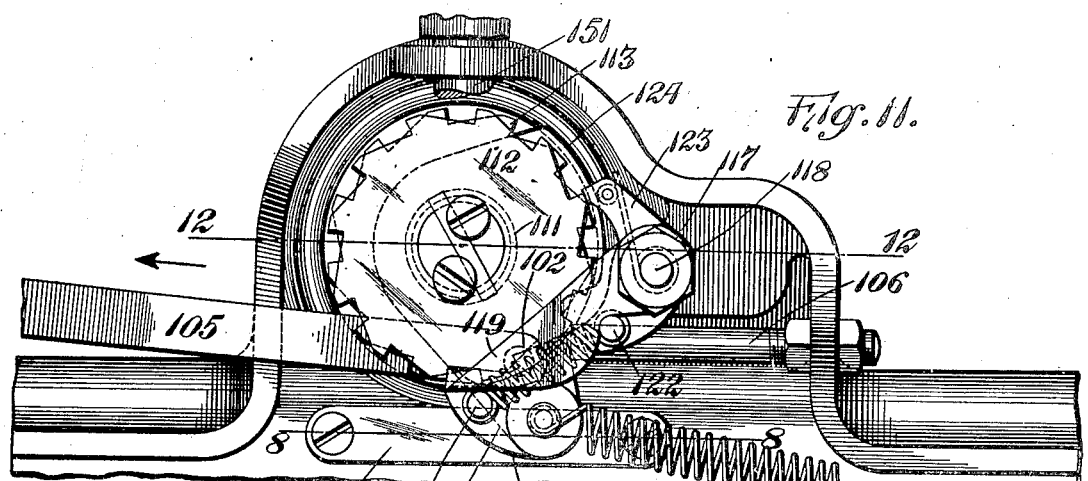
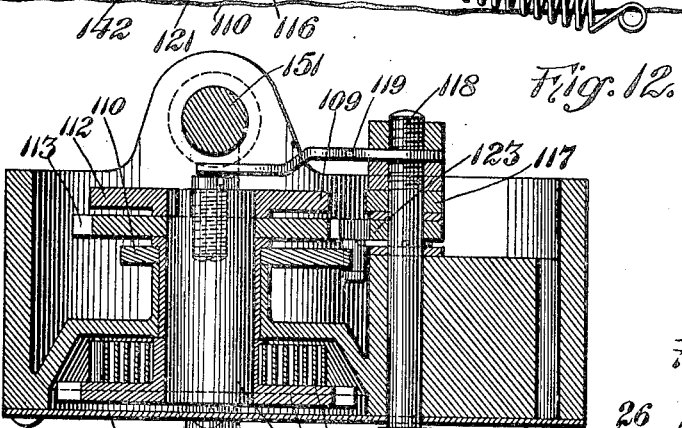
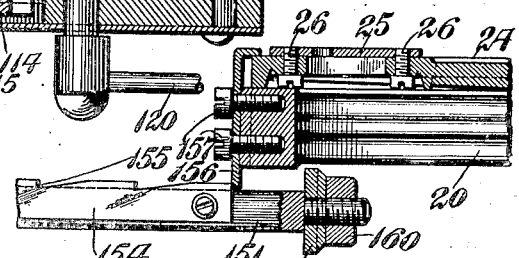
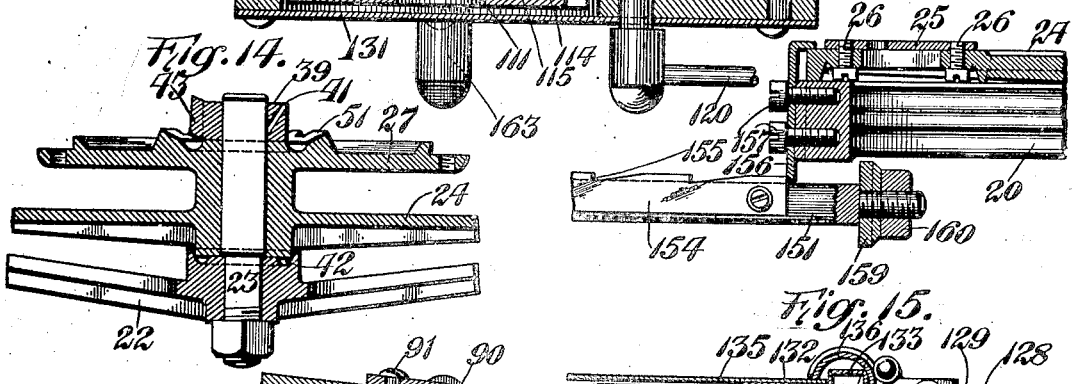
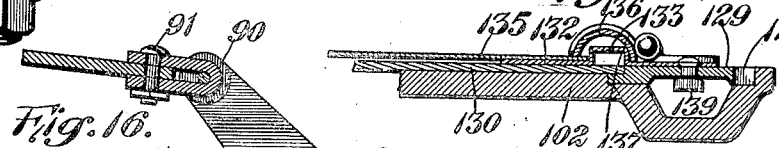
WITNESSES:
Chas. A. Becker.
W. A. Alexander.
INVENTOR
George Remnsnider,
BY
E. E. Huffman
ATTORNEY

UNITED STATES PATENT OFFICE.

GEORGE REMNSNIDER, OF BELLEVILLE, ILLINOIS, ASSIGNOR TO IDEAL STENCIL MACHINE COMPANY, OF BELLEVILLE, ILLINOIS, A CORPORATION OF ILLINOIS.

STENCIL-CUTTING MACHINE.

1,131,956.

Specification of Letters Patent.

Patented Mar. 16, 1915.

Application filed February 1, 1913. Serial No. 745,544.

*To all whom it may concern:*

Be it known that I, GEORGE REMNSNIDER, a citizen of the United States of America, residing at Belleville, county of St. Clair, State of Illinois, have invented a certain new and useful Stencil-Cutting Machine, of which the following is such a full, clear, and exact description as will enable any one skilled in the art to which it appertains to make and use the same, reference being had to the accompanying drawings, forming part of this specification.

The object of my invention is to improve the general construction of stencil machines, and particularly to improve the feeding mechanism by which the card-board or other material from which the stencil is formed is controlled.

Figure 1:
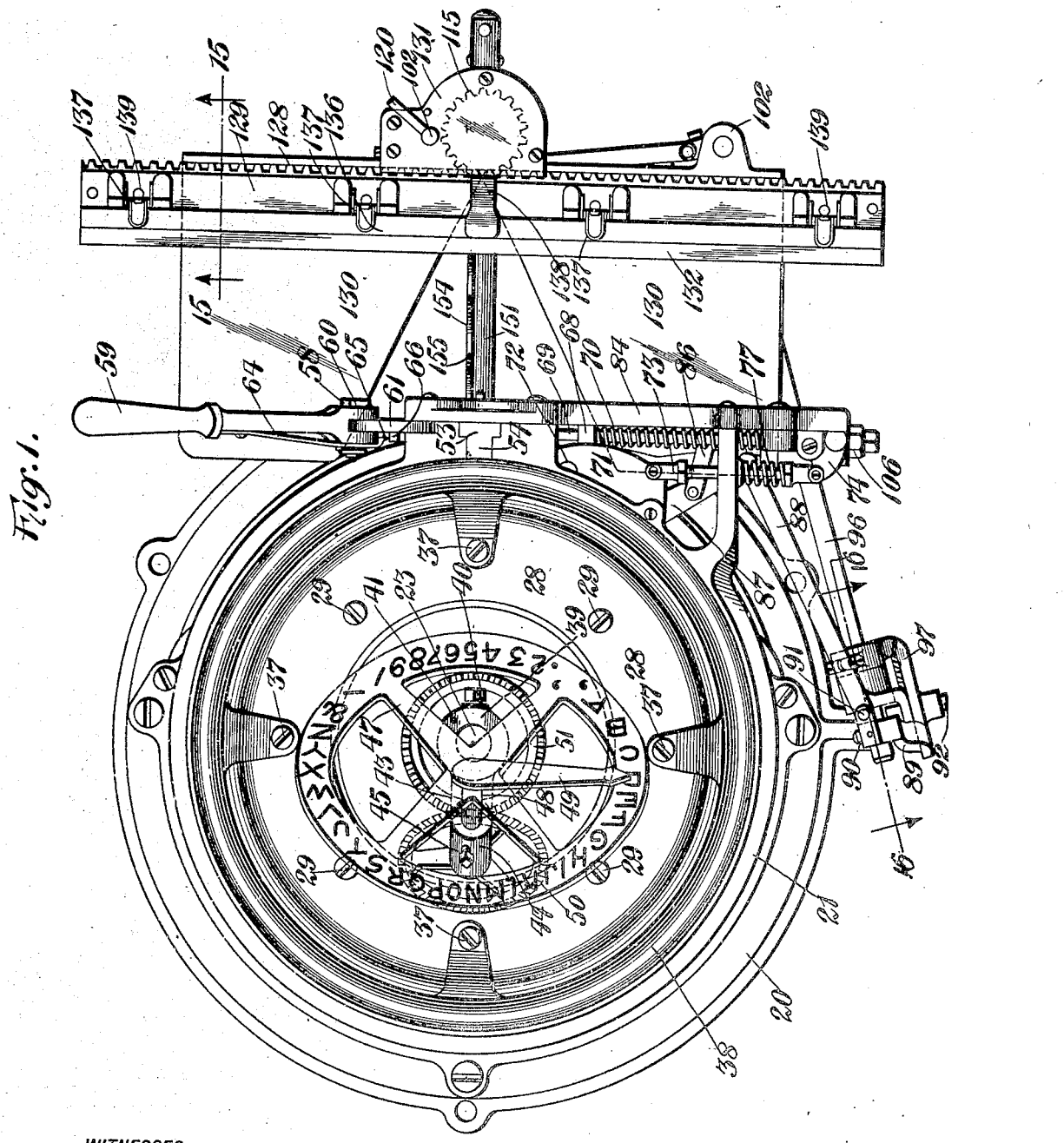
Figure 2:
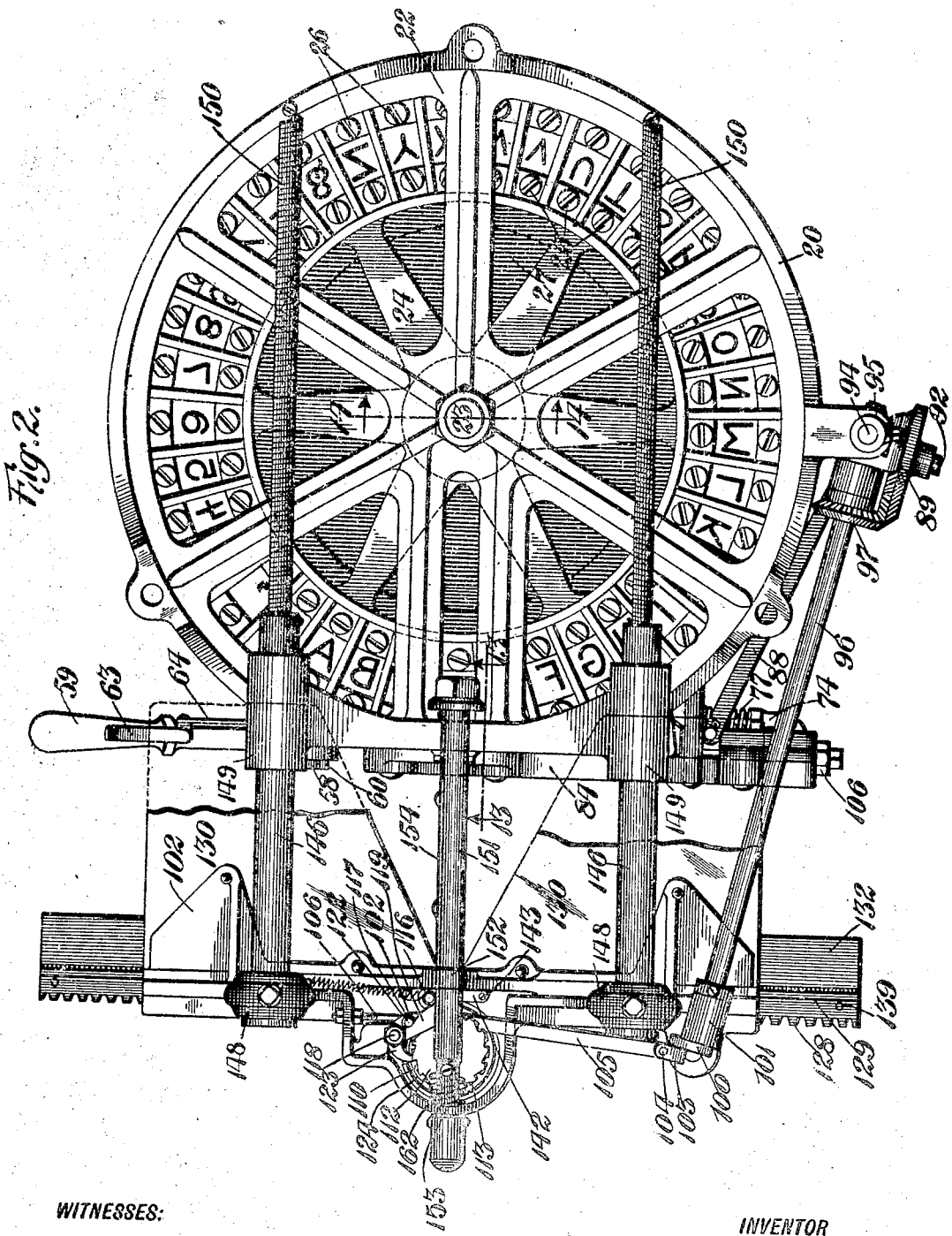

In the accompanying drawings which illustrate one form of machine made in accordance with my invention, Figure 1 is a top plan view; Fig. 2 is a bottom plan view; Fig. 3 is a side elevation; Fig. 4 is a front elevation; Fig. 5 is an enlarged section taken on the line 5—5 of Fig. 4; Fig. 6 is a section taken on the line 6—6 of Fig. 5; Fig. 7 is a section taken on the line 7—7 of Fig. 5; Fig. 8 is a section showing a detail of construction; Figs. 9 and 10 are enlarged detail views of one of the coils surrounding the punch shanks; Fig. 11 is a bottom plan view of a portion of the feeding mechanism; Fig. 12 is a section taken on the line 12—12 of Fig. 11; Fig. 13 is a section showing the detail of construction; Fig. 14 is a sectional view through the central part of the machine taken on the line 14—14 of Fig. 2; Fig. 15 is a section taken on the line 15—15 of Fig. 1; and Fig. 16 is a sectional view showing the detail of construction taken on the line 16—16 of Fig. 1.

Like marks of reference refer to similar parts in the several views of the drawings.

The casing of the machine consists of a lower part, or base, 20, and an upper part 21. The base 20 carries a spider 22, shown in detail in Fig. 2, in which is secured a central post or stud 23. Rotatably mounted upon the stud 23 is a member 24 which carries the dies 25, as best shown in Fig. 13, the dies being secured to the member 24 by means of screws 26. Carried by the member 24 is a flange 27, best shown in Fig. 14. To this flange 27, an annular member 28 is secured by screws 29, as best shown in Fig. 1.

This member 28 is provided with a double flange 30 in which is slidingly mounted the shanks of the punches 31 which are adapted to coöperate with the dies 25 hereinbefore referred to. The punches 31 are normally held in their raised position by means of coil springs 32 which bear, at their lower ends, on the lower flange 30 and, at their upper ends, on collars 33 which are secured around the shanks of the punches by means of lugs 34. Each of the collars 33 is provided with an upwardly and laterally extending portion 35 having a semi-circular opening 36 adapted to embrace the stem of the next succeeding punch and thus hold the punches in proper alinement with relation to the dies. In order to rotate the members 24 and 28, I secure to the member 28, by means of screws 37, a hand wheel 38. Surrounding the upper end of the stud 23 is a hub 39 which is secured in position by means of a set screw 40, as shown in Figs. 1 and 3. This hub 39 is provided with an oil hole 41 for supplying oil to the central stud 23, the oil after passing down around the stud 23, collects in an annular groove 42 in a central boss carried by the spider 22 so as to supply lubrication for the revolving members 24 and 28. Projecting at an angle from the hub 39 is an arm 43 carrying a hub 44. Secured in the hub 44 by means of a set screw 45 is a sleeve 46 carrying a dial 47 upon which are marked the various characters corresponding to the punches and dies in the machine. Passing through the sleeve 46 is a short shaft 48 having attached to one end a pointer 49 and at the other a bevel gear wheel 50 which meshes with a bevel gear wheel 51 formed on the upper face of the flange 27. It will be evident that by rotating the hand wheel 38, not only will the punch and dies be rotated, but the pointer 49 will be moved on the dial 47 to indicate the character which is in operative position.

At the center of the front of the machine, a sliding block 53 is set into the upper part 21 of the casing, as best shown in Figs. 1 and 7. This sliding block 53 is provided with a projecting portion 54 which is adapted to bear upon the upper end of the punch stem 31 and thus force the punch stem down into the die to cut the sheet which is held in the feeding mechanism, as will be hereinafter described. The block 53 is provided with roller 55 which engages with a cam slot 56 in a sliding plate 57. This plate 57 is pivoted at 58 to a handle 59. The handle 59 is, in turn, pivoted at 60 to a link 61 pivoted at 62 to the casing 21. It will be evident that by forcing the handle 59 downwardly, the sliding plate 57 will be moved forward so as to cause the cam slot 56 to operate on the roller 55 and depress the punch stem. In order to limit the movement of the plate 57, I provide the rear face of the same, with the projection 52, best shown in Fig. 6 of the drawings. This projection is adapted to strike against an adjustable stop 67 to limit its movement in one direction and against a second adjustable stop 106 to limit its movement in the opposite direction.

In order to limit the movement of the sliding plate 57 to secure a half feed, I pivot to the handle 59 a finger piece 63 which is connected by means of a link 64 with a detent 65 adapted to be thrown into the path of a pin 66 carried on the link 61. Carried on the rear face of the sliding plate 57 is a block 68 sliding on a rod 69 carried by the casing. Surrounding this rod 69 is a coil spring 70 which is adapted to return the plate to its normal position after it has been actuated by the handle 59.

In order to properly center the character punches before the characters are cut by means of the punches and dies, I pivot to the casing 21, adjacent to the sliding block 53, an arm 71, best shown in Fig. 5. This arm 71 is provided with a semi-circular recess 72 for embracing one of the punch stems 31 so as to properly center the rotating portion of the machine. Pivoted to the arm 71 is a link 73, the opposite end of which is pivoted to a short lever 74 provided with an antifriction roll 75 adapted to be operated by the inclined end 76 of the plate 57 hereinbefore referred to. The arm 71, link 73 and lever 74 are returned to their normal position by means of a coil spring 77 surrounding the link 73 and bearing upon a projecting portion of the casing 21. Formed in the plate 57 is a slot 78 which is formed, as best shown in Fig. 5, so as to leave an inclined face acting as a cam to actuate the roller 79 carried by a lever 80. This lever 80 is pivoted to a block 81 which is secured by means of a bolt 82 and a nut 83 to a plate 84 which covers the main portion of the sliding plate 57, as best shown in Fig. 4 of the drawings. The bolts 82 passes through an elongated slot in the plate 84 so that the lever 80 may be adjusted to a slight distance in the direction of the plate 57 so as to adjust the timing of the feeding mechanism because of wear or any other reason. The end of the lever 80 is pivoted to a link 86 which is in turn pivoted to a lever 87, which, in turn is pivoted to a link 88, leading to a bell crank lever 89, as best shown in Figs. 1, 3 and 4. The connection between the lever 88 and the bell crank lever 89 is such that there is a pivot 90 giving movement in a vertical plane and a pivot 91 giving movement in a horizontal plane. The bell crank lever 89 is pivoted to a member 93. The member 93 is provided with a vertical shaft 94 which is pivoted in the bearing 95 carried by the base 20 of the casing. The block 93 has slidingly mounted in it a shaft 96 which leads to the feeding mechanism. This shaft 96 is surrounded by a segment 97 which is provided with bevel teeth 98 engaged with similar bevel teeth 99 on one end of the bell crank lever 89, as best shown in Fig. 4 of the drawings. The shaft 96 is adapted to slide longitudinally through the sector 97 but to be incapable of rotation independently thereof. The opposite end of the shaft 96 is secured to a crank 100 adjacent to a bearing 101 which is pivoted to the lower face of the casting 102, which is best shown in Fig. 2 of the drawings. Secured to the crank 100 by horizontal and vertical pivots 103 and 104, respectively, is link 105 which leads to the feeding mechanism which will now be described.

The link 105 is pivoted to a lever 110, best shown in Figs. 11 and 12. This lever 110 surrounds a short shaft 111 carrying ratchet wheels 112 and 113 respectively. The shaft 111 also has secured to it a coil spring 114 and a gear wheel 115, the purpose of which is to operate the feeding mechanism in a longitudinal direction, as will be hereinafter more fully described. Pivoted to the lever 110 is a pawl 116 which engages with the ratchet wheel 112. The ratchet wheel 112 is normally prevented from return movement by means of a pawl 117 surrounding a rock shaft 118 in the casting 102. The rock shaft 118 has secured to it an arm 119 and a handle 120. When the handle 120 is operated to rock the shaft 118, the arm 119 comes into contact with pins 121 and 122 on the pawls 116 and 117, respectively. It will be obvious that when the link 105 is actuated through the movement of the main handle 59 of the machine, the shaft 111 will be rotated. In the normal operation of the machine, the link 105 moves a sufficient distance to rotate the shaft 111 through an angle represented by two of the teeth of the ratchet wheel 112. In order to prevent over rotation of the shaft 111, the ratchet wheel 113 is adapted to be engaged by a pawl 123. It is, however, necessary to hold this pawl out of engagement with the ratchet wheel 113 until just before the end of the feed stroke. In order to accomplish this, I provide the lever 110, hereinbefore referred to, with a cam face 124, which normally holds the pawl 123 out of engagement with the wheel, as shown in Fig. 11. When, however, the end of the stroke is reached, the cam face will move out of engagement with the pawl and allow the same to engage the wheel 113 and thus prevent over rotation. The gear wheel 115 carried by the shaft 111 engages with a rack 128 on the edge of a feed plate 129. This feed plate 129 is slidingly mounted in the casting 102, as best shown in Fig. 15 of the drawings. The plate is held in the groove by means of a pair of plates 130 which extend backwardly and form the main portion of the table of the machine, and also by cover plate 131, which covers the gear wheel 115 of the feed mechanism. The feed plate 129 has secured to it a sheet metal strip 132 having a raised portion 133 forming a shoulder against which the edge of the stencil sheet is adapted to be placed. The stencil sheet 135, Fig. 15. is clamped against the sheet metal strip 132 by means of a curved clamping member 136 which is hinged to the plate 129 and held against the stencil sheet by means of coil springs 137, Fig. 1. A finger piece 138 is used for releasing the clamping member 136. In order to limit the movement of the feed plate 129, the said plate is provided with a pair of stops 139, Figs. 2 and 15. These stops 139 are adapted to strike against a sleeve 140, shown in detail in Fig. 8. This sleeve 140 is placed around a short shaft 141 carried by a block 142 secured by screws 143 to the casting 102. The sleeve 140 projects into the path of the pins 139 and bears at each end against coil springs 144. It will be evident from this construction that the sleeve 140 will serve as a bumper and absorb the shock when the feed plate 129 is moved to the end of its travel either through operation of the handle or by releasing the feed mechanism. The feed table, formed by the casting 102 and the plates 130, is carried by a pair of sleeves 146 which are secured by set screws 147 in lugs 148 depending from the casting 102. The rear end of this sleeve 146 slides in lugs 149 depending from the base 20 of the machine. Secured within the sleeve 146 are coil springs 150, the opposite ends of which are secured to the base of the machine, as best shown in Fig. 2 of the drawings. These springs 150, therefore, tend to move the entire feed table inwardly toward the center of the machine. In order to hold the table at different distances from the body of the machine, a rock shaft 151 is mounted in lugs 152 and 153 depending from the casting 102. This rock shaft 151 has secured to it a plate 154, best shown in Fig. 13. This plate 154 is provided with shoulders or teeth 155, the distance of which apart regulates the distance between the lines of the completed stencil sheet. These teeth 155 are adapted to strike against the plate 156 secured to the base 20 of the machine by means of screws 157, the upper end of said plate 156 being turned over, as shown at 158, so as to form a detent for holding down the plate 24 which carries the dies 25 so as to prevent the dies from being sprung upwardly in case the punches should stick during the operation of the machine. The end of the rock shaft 151 is provided with a washer 159 which is adapted to come into contact with the rear face of the plate 156 and thus prevent the feed table from being entirely disengaged from the machine. The washer 159 is held in place by a nut 160. By removing the nut 160 and detaching the springs 150, the feed table can be entirely disengaged from the machine. The rock shaft 151 is provided with a coil spring 162 which normally holds the shaft in position to cause one of the teeth 155 to engage with the plate 156. The rock shaft, however, may be turned by means of a handle 163 so as to disengage the said teeth from the plate and allow the table to be moved either in or out to adjust it for different lines of characters on the stencil sheet.

The operation of my machine, briefly described, is as follows: When it is desired to begin the formation of a stencil sheet, the handle 120 is operated to release the dogs 116 and 117 from the ratchet wheel 110 so that the carriage may move to the extreme right hand position. The feed table is also drawn out into the position shown in Fig. 1 of the drawings. When the parts are in this position, the stencil sheet will be clamped between the plate 132 and the curved clamping member 133 and will be in proper position to begin the formation of the stencil. After moving the punch and die carrier by means of the hand wheel 38 so as to move the pointer 49 to indicate the proper character on the dial 47, the handle 59 is depressed. The depression of the handle 59 moves the cam plate 57 toward the left hand side of the machine. The movement of this cam plate 57 actuates the lever 74 through the contact of its inclined end 76 with the roller 75. The movement of the lever 74 is communicated through the link 73 to the pivoted arm 71 which engages with one of the punch shanks 31 so as to properly center the character. At the same time that this movement takes place, the lever 80 is moved on its pivot by the contact of the inclined face 78 with the roller 79. The movement of the lever 80 is communicated through the link 86 and through the lever 87 to the link 88, the movement of which is communicated through the beveled gear mechanism shown in detail in Fig. 16, to the rock shaft 96. This rock shaft 96 communicates movement through the link 105 to the feeding mechanism contained within the casting 102. This feeding mechanism advances the carriage toward the left hand space. Between words, it is desirable to make a space smaller than the space required for a letter. In order to accomplish this, I use the half space mechanism above described. In order to use the half space mechanism, the finger lever 63 is drawn up toward the handle 59 and at the same time the handle is depressed. This throws the link 65 into the path of the pin 66 so that the handle can be moved only a sufficient distance to advance the ratchet wheel 110 through a distance of one tooth instead of two teeth as in the normal operation of the machine. After one line of a stencil has been completed, the handle 120 is again operated to release the carriage and to allow it to move to its extreme right hand position and, at the same time, the handle 163 is operated to rotate the shaft 151 and thus allow the feeding table to move inwardly a distance equal to one line of the stencil. The above operation is now repeated.

Having fully described my invention, what I claim as new and desire to secure by Letters-Patent of the United States is:

1. In a stencil cutting machine, the combination with a rotary punch and die carrying member, of a table movable toward and away from the said member, a laterally movable carriage carried by said table and adapted to present a stencil sheet to the punch and die mechanism, and swiveled operating connections for said carriage, said connections being arranged below the feed plane of the stencil sheet.

2. In a stencil cutting machine, the combination with a rotary punch and die carrying member, of a table movable toward and away from said member, a laterally movable carriage carried by said table and adapted to present a stencil sheet to the punch and die mechanism, feeding mechanism for the carriage carried by said table, and swiveled operating connections for said feeding mechanism.

3. In a stencil cutting machine, the combination with a rotary punch and die carrying member, of a table movable toward and away from said member, a laterally movable carriage carried by said table and adapted to present a stencil sheet to the punch and die member, feeding mechanism for the carriage carried by said table, and swiveled operating connections for said feeding mechanism, said operating connections making sliding connection with said feeding mechanism.

4. In a stencil cutting machine, the combination with a rotary punch and die carrying member, of punches and dies carried by said member, a handle for operating said punches, a laterally movable carriage, bevel gearing, a link operated by said handle for actuating said bevel gearing, and swiveled connections operated from said beveled gearing for advancing said carriage.

5. In a stencil cutting machine, the combination with a rotary punch and die carrying member, of punches and dies carried by said member, a laterally movable carriage, a handle for operating the punches, bevel gearing operated from said handle, a rock shaft operated by said bevel gearing and adapted to telescope therewith, and driving mechanism for said carriage operated from said rock shaft.

6. In a stencil cutting machine, the combination with a rotary punch and die carrying member, of a table movable toward and away from said member, a laterally movable carriage carried by said table, feeding mechanism for said carriage carried by said table, and telescopic swiveled connections for operating said feeding mechanism.

7. In a stencil cutting machine, the combination with a rotary punch and die carrying member, of a sliding plate for actuating the punches, a pivoted arm adapted to engage with one of the punches to center the punch and die carrying member, a lever adapted to engage with a cam face on said sliding plate, and a link connecting said lever and arm, whereby the latter is moved into engagement with one of the punches to center the punch and die carrying mechanism.

8. In a stencil cutting machine, the combination with a rotary punch and die carrying member, of a laterally movable carriage, a handle for actuating said carriage and a punch, and means for limiting the movement of said handle to secure a half feed and also limiting the movement of the punch.

9. In a stencil cutting machine, the combination with a punch and die carrying member, of a laterally movable carriage, feeding mechanism for said carriage including a ratchet wheel, a handle normally moving said ratchet wheel two teeth and also actuating a punch, and means for limiting the movement of said handle to move said wheel one tooth, whereby a half feed of the carriage is obtained and the movement of the punch is limited.

10. In a stencil cutting machine, the combination with a punch and die carrying member, of a laterally movable carriage, feeding mechanism for said carriage including a ratchet wheel, a handle normally moving said ratchet wheel two teeth, and a stop mechanism carried by the handle for limiting its movement to actuate said ratchet wheel one tooth.

11. In a stencil cutting machine, the combination with a punch and die carrying member, of a laterally movable carriage, feeding mechanism for said carriage including a ratchet wheel, a sliding plate for actuating said ratchet wheel, said sliding plate normally actuating said ratchet wheel through two teeth, a pivoted handle for actuating said sliding plate, a detent adapted to be thrown into position to limit the movement of said handle whereby said ratchet wheel is moved but one tooth, and a finger piece carried by the handle for controlling said detent.

12. In a stencil cutting machine, the combination with a punch and die carrying member, of a laterally movable carriage, feeding mechanism for said carriage including a ratchet wheel, a handle normally moving said ratchet wheel two teeth, means for limiting the movement of said handle to move said ratchet wheel one tooth, a second ratchet, and automatic means engaging said second ratchet to prevent the rotation of said first ratchet wheel more than two teeth.

13. In a stencil cutting machine, the combination with a rotary punch and die carrying member, of a table movable toward and away from said member, a laterally movable carriage mounted on said table and adapted to present a stencil sheet to the punch and die mechanism, a sliding plate for actuating the punches, a lever actuated from said sliding plate, an oscillating member, a second oscillating member driven from said first named oscillating member, a link connecting said first named oscillating member with said lever, feeding mechanism for said carriage carried by the table, a rock shaft having sliding connection with said second oscillating member, and means for driving said feeding mechanism from said rock shaft.

14. In a stencil cutting machine, the combination with a rotary punch and die carrying member, of a table movable toward and away from said member, a laterally movable carriage mounted on said table and adapted to present a stencil sheet to the punch and die mechanism, a sliding plate for actuating the punches, a lever actuated from said sliding plate, an oscillating member, a second oscillating member driven from said first named oscillating member, a link connecting said first named oscillating member with said lever, feeding mechanism for said carriage carried by the table, a rock shaft having sliding connection with said second oscillating member and pivotally connected to said table, and means for driving said feeding mechanism from said rock shaft.

In testimony whereof, I have hereunto set my hand and affixed my seal in the presence of two subscribing witnesses.

GEORGE REMNSNIDER. [L. S.]

Witnesses:
W. A. ALEXANDER,
G. M. SHORE.